US006970447B2

(12) United States Patent
Burgess et al.

(10) Patent No.: US 6,970,447 B2
(45) Date of Patent: Nov. 29, 2005

(54) MULTI-CARRIER METHOD FOR PROVIDING ACCESS TO A WIRELESS COMMUNICATION SYSTEM

(75) Inventors: John K Burgess, Morristown, NJ (US); Orlett Wanda Pearson, Aurora, IL (US); Eshwar Pittampalli, Randolph, NJ (US); David Albert Rossetti, Randolph, NJ (US); Lily H Zhu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 788 days.

(21) Appl. No.: 10/086,507

(22) Filed: Mar. 1, 2002

(65) Prior Publication Data

US 2004/0203702 A1 Oct. 14, 2004

(51) Int. Cl.[7] .......................... H04B 7/216; H04J 13/00; H04J 3/12
(52) U.S. Cl. ....................... 370/342; 370/479; 370/522
(58) Field of Search ............................ 370/328, 335, 370/342, 479, 522

(56) References Cited

U.S. PATENT DOCUMENTS 6,363,242 B1 * 3/2002 Brown et al. ................ 455/70
6,389,298 B1 * 5/2002 Abramovici et al. ...... 455/552.1
2003/0161283 A1 * 8/2003 Tiedemann et al. ......... 370/329

* cited by examiner

Primary Examiner—Seema S. Rao
Assistant Examiner—Kevin C. Harper
(74) Attorney, Agent, or Firm—Christopher Malvone

(57) ABSTRACT

Multiple carriers are used to provide access to a wireless communication system. A first carrier transmits synchronization messages in accordance with the IS-95B standard (communication protocol revision 5). The synchronization message directs mobiles attempting to access the network to a paging channel on the first carrier. The paging channel enables mobiles conforming to a standard of IS-2000 revision 0 or older to access the wireless network. The paging channel also includes an extended global service redirection message (EGSRM) that instructs mobiles conforming to the IS-2000 revision A standard (communication protocol revision 7) to use a synchronization channel on a second carrier for reception of an IS-2000 revision A synchronization message. The IS-2000 revision A (communication protocol revision 7) synchronization message instructs the mobile to access the wireless communication network using a BCCH and/or FCCCH on the second carrier, or using a BCCH and/or FCCCH on the first carrier.

3 Claims, 3 Drawing Sheets

FIG. 2
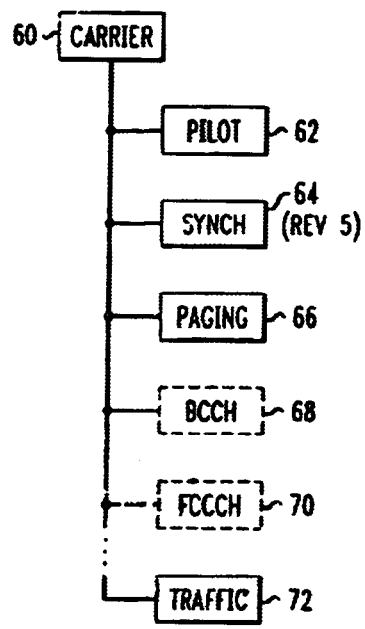
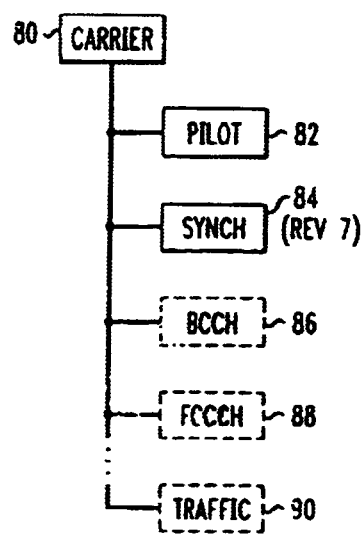

MULTI-CARRIER METHOD FOR PROVIDING ACCESS TO A WIRELESS COMMUNICATION SYSTEM

BACKGROUND OF THE INVENTION

1. Field of the Invention

The present invention relates to wireless communications; in particular, using multiple carriers to provide access to a wireless communication system.

2. Description of the Related Art

Accessing a wireless communication network requires that a mobile communication device receive information transmitted from a base station on several channels. For example, the pilot channel identifies the base station and provides timing to the mobile unit, the synchronization channel provides the mobile unit with information used to locate other channels such as a paging channel, a broadcast control channel (BCCH), and a forward common control channel (FCCCH). In older communication systems, such as systems that follow the TIA standard IS-95A or B, the paging channel provides the mobile unit with information on how to make voice or data calls and it also informs the mobile of incoming calls. In newer systems such as systems that follow TIA standard IS-2000 revision A, the BCCH informs the mobile of how to initiate a voice or data call, and the FCCCH informs the mobile of incoming calls. These different standards have evolved as technology has advanced and sometimes make it difficult to configure networks so that both the newer mobiles conforming to the newer standard and the older mobiles conforming to the older standards can access the communications network.

Such a problem exists with regard to messages carried on the synchronization channel. As the standards have changed, the length of messages carried on the synchronization channel has increased. For example, synchronization messages under the IS-95B standard contain 26 octets, and synchronization messages under the IS-2000B standard are variable in length and may be greater than or equal to 28 octets long. Unfortunately, some older mobiles have difficulty interpreting a synchronization message if it is longer than expected. For example, some older mobiles cannot interpret synchronization messages that are longer than 27 octets, and yet another group of older mobiles cannot interpret synchronization messages that are longer than 28 octets. As a result, it is necessary to provide a flexible synchronization messaging format that can be used by different types of older mobiles, while offering the newer mobiles all the advantages provided by the newer technology contained in the newer standards.

SUMMARY OF THE INVENTION

An embodiment of the current invention uses multiple carriers to provide access to a wireless communication system. A first carrier transmits synchronization messages in accordance with the IS-95B standard (communication protocol revision 5). The synchronization message directs mobiles attempting to access the network to a paging channel on the first carrier. The paging channel enables mobiles conforming to a standard of IS-2000 revision 0 or older to access the wireless network. The paging channel also includes an extended global service redirection message (EGSRM) that instructs mobiles conforming to the IS-2000 revision A standard (communication protocol revision 7) to use a synchronization channel on a second carrier for reception of an IS-2000 revision A synchronization message. The IS-2000 revision A (communication protocol revision 7) synchronization message instructs the mobile to access the wireless communication network using a BCCH and/or FCCCH on the second carrier, or using a BCCH and/or FCCCH on the first carrier.

BRIEF DESCRIPTION OF THE DRAWINGS

FIG. 2 illustrates two carriers and their associated channels;

DETAILED DESCRIPTION OF THE INVENTION

Figure 1:
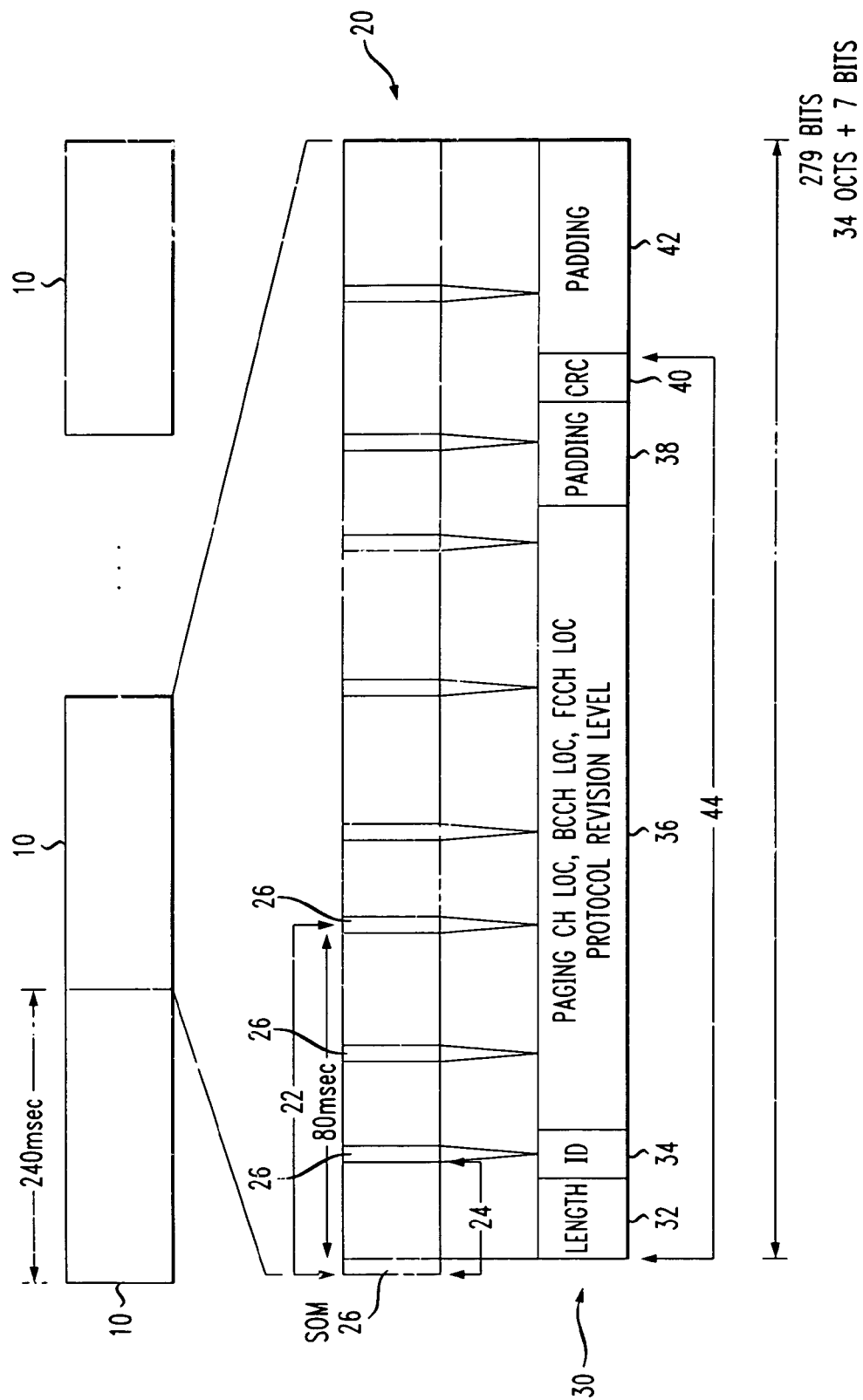
FIG. 1 illustrates a synchronization channel format.

FIG. 1 illustrates the format of a synchronization channel. The synchronization channel contains a sequence of synchronization message frames 10. In a communication system conforming to the IS-95A, IS-95B, IS-2000 revision 0, or IS-2000 revision A standards, each synchronization message frame is 240 milliseconds long. In other communication systems, different synchronization channel formats may be used. Frame sequence 20 illustrates a series of synchronization channel super frames 22 that compose each of synchronization message frames 10. In systems that conform to the above-referenced standards, each synchronization channel super frame is 80 milliseconds long. As a result, each synchronization message frame 10 comprises three synchronization channel super frames 22. Each synchronization channel super frame 22 comprises synchronization channel frames 24. In an embodiment conforming to the above-referenced standards, there are three synchronization channel frames 24 in each synchronization channel super frame 22. Each synchronization channel frame 24 begins with a 1-bit start of message (SOM) field 26. The start of message field bit is set for the first synchronization channel frame 24 in an overall synchronization message frame 10. The remaining start of message fields 26 are not set for each synchronization, channel frame 24 within a particular synchronization message frame 10.

The synchronization message 30 contained in synchronization message frame 10 is interpreted by removing start of message field 26 from each of the synchronization channel frames 24. Synchronization message field 30 contains information such as length field 32, ID field 34, synchronization information field 36, padding 38, CRC field 40 and padding field 42. In systems conforming to the above-referenced standards, the overall length of message field 30 including padding 42 is 279 bits. Length field 32 provides information to the mobile regarding the length of the synchronization message 44 in octets while excluding padding field 42. Field 36 provides the mobile with information such as the location of the paging channel, the highest communication protocol revision level supported by the transmitting base station, the location of the BCCH and FCCCH. It should be recalled that the paging channel is used by older mobiles to access services provided by the wireless network and for notification of incoming communications. Similarly, the BCCH and the FCCCH are used by newer mobiles to get information on accessing the communication network (and newer advanced services), and for notification of incoming communications, respectfully. Padding field 38 and 42 are simply fillers containing unused information and CRC field 40 is an error correction and detection field.

In communication systems conforming to the IS-95A or IS-95B standard (sometimes referred to as protocol revision 5), synchronization message 44 is 26 octets long. In communications systems conforming to the IS-2000 revision 0 standard (sometimes referred to as protocol revision 6), synchronization message 44 is 28 octets long. In the newer systems conforming to the IS-2000 revision A standard (sometimes referred to as protocol revision 7) synchronization message 44 is variable in size and may be greater than or equal to 28 octets long.

The differing lengths of synchronization message 44 make backward compatibility difficult for some older mobiles. For example, a first class of older mobiles cannot accept synchronization messages 44 longer than 27 octets, a second class of older mobiles cannot accept synchronization messages 44 longer than 31 octets, and yet a third class of older mobiles can accept a variable length synchronization message 44.

FIG. 2 illustrates the channel structure of two or more carriers used for providing access to the wireless communication system. Carrier 60 includes channels such as pilot channel 62, synchronization channel 64, paging channel 66, BCCH 68, FCCCH 70 and traffic channels 72. Carrier 60 transmits a synchronization message on the synchronization channel 64 in accordance with the IS-95B standard (protocol revision 5). Carrier 60 also includes paging channel 66 which carries an extended global service redirection message (EGSRM) which directs mobiles conforming to the IS-2000 revision A standard (protocol revision 7) to carrier 80. It should be noted that BCCH 68 and FCCCH 70 are optional and are needed if carrier 60 will be used to support communications with mobiles conforming to protocol revision 7.

Carrier 80 includes pilot channel 82, synchronization channel 84, BCCH channel 86, FCCCH channel 88 and traffic channels 90. Synchronization channel 84 carries synchronization messages conforming to the IS-2000 revision A standard (protocol revision 7). When mobiles conforming to revision 7 receive synchronization messages from channel 84 they are directed to access the wireless communication system using either BCCH channel 86 and FCCCH channel 88 of carrier 80 or BCCH channel 68 and FCCCH channel 70 of carrier 60. It should be noted that channels 86, 88 and 90 are optional. These channels are necessary if carrier 80 is to support communications with phones conforming to protocol revision 7. If carrier 80 is not to support communications with mobiles conforming to protocol revision 7, the mobile is directed to carrier 60 and channels 86, 88 and 90 may not be needed.

Figure 3:
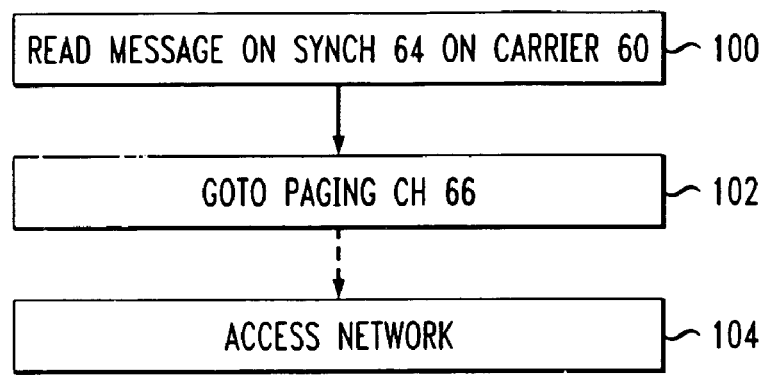
FIG. 3 illustrates IS-95A, IS-95B, and IS-2000 revision 0 mobiles accessing a wireless communication network.

FIG. 3 illustrates the procedure followed by IS-95A and B and IS-2000 revision 0 (protocol revision 6) for accessing wireless communication system. In step 100, the mobiles receive a synchronization message received on synchronization channel 64 of carrier 60. In step 102, the mobiles use the information from the synchronization message to access paging channel 66 of carrier 60. After using the information received paging channel 66, the mobiles access the wireless communication system in step 104.

Figure 4:
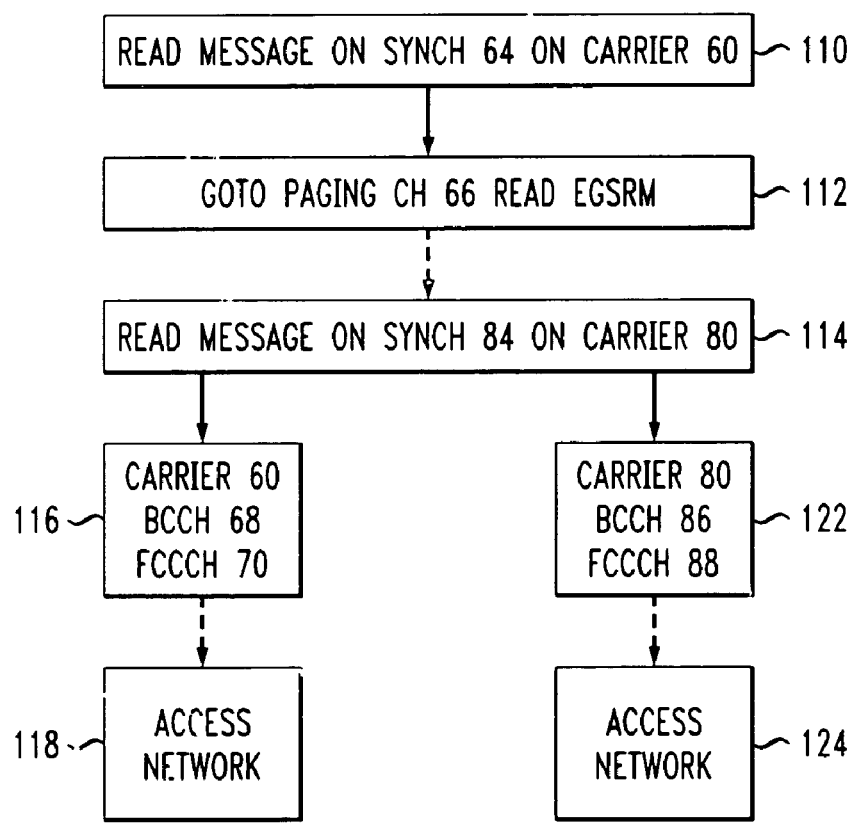
FIG. 4 illustrates an IS-2000 revision A mobile accessing wireless communication network.

FIG. 4 illustrates the procedure used by mobiles that conform to IS-2000 revision A for accessing the wireless communication system. In step 110, the mobile reads the synchronization message from synchronization channel 64 of carrier 60. In step 112, the mobile uses the information received from the synchronization message to access paging channel 66 of carrier 60. Paging channel 66 includes an extended global service redirection message that redirects IS-2000 revision A (protocol revision 7) conforming mobiles to read a synchronization message from synchronization channel 84 of carrier 80 in step 114. The synchronization message received in step 114 is used to direct the IS-2000 revision A mobile to access the wireless communication system using either carrier 60 or carrier 80. If the message directs to mobile to use carrier 60, step 116 is executed where the mobile accesses BCCH channel 68 and FCCCH channel 70 of carrier 60 which results in the mobile gaining access to wireless communication system in step 118. If in step 114 the mobile receives a message instructing it to access the wireless communication system using carrier 80, the mobile receives messages from BCCH channel 86 and FCCCH channel 88 of carrier 80 in step 122. This results in the mobile accessing the wireless communication system using carrier 80 in step 124.

We claim:

1. A method for providing access to a wireless communication system, comprising the steps of:
   transmitting a first communications protocol revision synchronization message in a first synchronization channel on a first carrier, the first communications protocol revision synchronization message directing mobiles to a paging channel on the first carrier;
   transmitting a redirection message in the paging channel on the first carrier, the redirection message instructing mobiles conforming to a second protocol revision to obtain a second communications protocol revision synchronization message from a second synchronization channel on a second carrier; and
   transmitting the second communications protocol revision synchronization message in the second synchronization channel on the second carrier, the second communications protocol revision synchronization message directing the mobile to a channel on the first carrier.

2. The method of claim 1, wherein the channel on the first carrier is a BCCH.

3. The method of claim 1, wherein the channel on the first carrier is a FCCCH.

* * * * *